Jan. 28, 1969     W. E. HULL     3,424,403
MASS RELEASE MECHANISM FOR SATELLITES
Filed Feb. 14, 1967
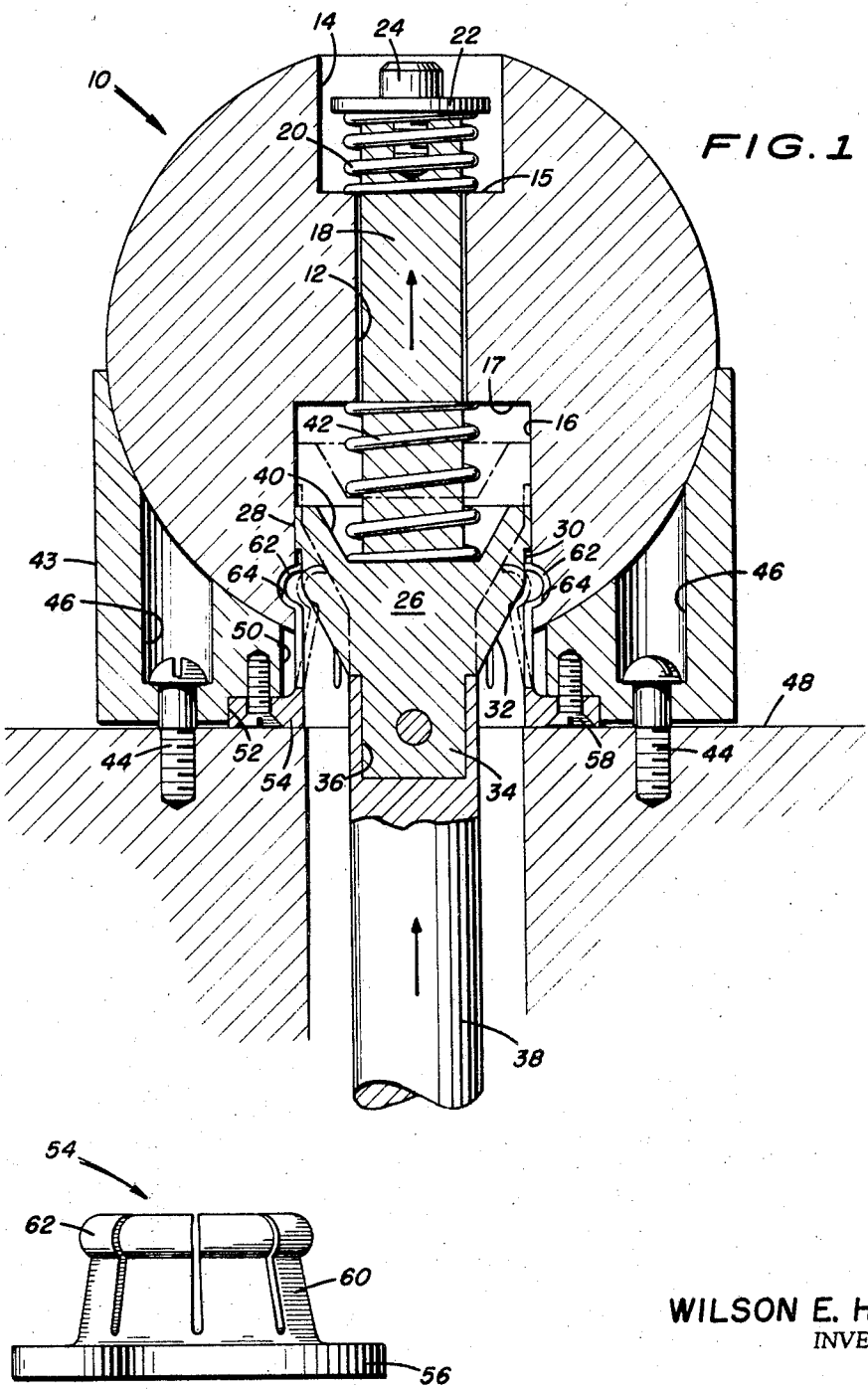
WILSON E. HULL
INVENTOR
BY
*J. O. Tresansky*
ATTORNEY

United States Patent Office 3,424,403
Patented Jan. 28, 1969

3,424,403
MASS RELEASE MECHANISM FOR SATELLITES
Wilson E. Hull, Washington, D.C., assignor to the United States of America as represented by the Secretary of the Navy
Filed Feb. 14, 1967, Ser. No. 616,447
U.S. Cl. 244—1         10 Claims
Int. Cl. B64g 9/00; F16b 17/00

ABSTRACT OF THE DISCLOSURE

The invention relates to a ball-shaped mass and means for releasably holding said mass to a satellite. The ball-shaped mass is attached to the end of a generally cylindrical actuating shaft which has an enlarged, inverted frusto-conical portion secured to the end of an extendible boom. With the boom in a retracted position, the ball-shaped mass is received in a cup-like support. A spring collar, fixedly positioned within said support member, surrounds the frusto-conical portion of the actuating shaft and is provided with a plurality of spring fingers having outwardly bowed end portions which engage in an annular groove of the ball-shaped mass to releasably latch said mass to the cup-like support. The spring fingers are purposely preformed so that, when the boom begins to move toward an extended position, they will move radially toward one another and disengage from the ball-shaped mass, thereby unlatching said mass from the cup-like support and permitting said mass to be extended at the end of the extendible boom.

---

The present invention relates generally to a mass release mechanism, and more particularly to a mass and means for releasably holding said mass on a satellite.

According to the invention, a ball-shaped mass is mounted on the end of a generally cylindrical actuating shaft having an enlarged generally frusto-conical portion which is secured at the end of an extendible boom of a satellite. With the boom in a retracted position, the mass is received in a cup-like support which is attached to the satellite wall. A collar, comprising a plurality of spring fingers, is mounted within the support and surrounds the actuating shaft. The enlarged frusto-conical portion of the shaft engages the fingers and biases them to seat in an annular groove provided in the ball-shaped mass, thus releasably locking said mass in the support. When the boom is extended, the enlarged frusto-conical portion of the actuating shaft will become disengaged from the collar, the resilient fingers of which are purposely preformed so that they will move resiliently from the annular groove of the ball-shaped mass, and unlock the mass so that it may be deployed on the end of the boom in spaced relationship to the satellite. A pair of coil springs are provided on the actuating shaft to unlock smoothly the ball-shaped mass and to damp oscillations of the mass at the end of the extendible boom.

It is therefore an object of the invention to provide means for releasably holding a mass on a satellite.

A further object of the invention is to provide means upon which a mass is slidably mounted and which is cooperable with a locking means for releasably holding the mass in a position adjacent to a satellite.

A still further object of the invention is to provide means which, in a first position, will cooperate with a locking means to releasably hold a mass adjacent to a satellite and which, in a second position, will release said mass, permitting the deployment thereof in spaced relationship to a satellite.

Still another object of the invention is to provide means for attaching a mass to an extendible boom.

And another object of the invention is to provide means for smoothly releasing a mass from a locked position adjacent to a satellite and for damping oscillations of said mass.

Other objects and many of the attendant advantages of this invention will be readily appreciated as the same becomes better understood by reference to the following detailed description, when considered in connection with the accompanying drawings, wherein:

FIG. 1 is a detail section illustrating a ball-shaped mass releasably locked in place upon a support; and FIG. 2 is a detail elevation showing the spring collar employed for locking the ball-shaped mass upon the support.

With more particular reference to the drawing, a mass, which may be of ball shape, is shown generally at 10 and is provided with a central bore 12, the upper end of which opens into an enlarged annular recess 14 having a bottom wall 15, and the lower end of which communicates with an enlarged bore 16 having a top wall 17. The mass 10 is slidably mounted on a generally cylindrical actuating shaft 18 which extends through the central bore 12 and partially protrudes into the annular recess 14. A coil spring 20 surrounds the protruding upper end portion of the actuating shaft 12. One end of the spring 20 engages the bottom wall 15 of the recess 14 and the other end engages a washer 22 overlying said spring and fastened on the end of the actuating shaft 18 by a cap screw 24. The lower end portion of the actuating shaft 18 includes an enlarged frusto-conical portion 26 having a cylindrical wall 28, slidably received within the inverted bore 16 and a reduced annular land 30 which is located directly beneath said cylindrical wall 28. Adjacent the land 30 is a tapered side wall 32. At its lower end the actuating shaft 18 terminates in a reduced diameter plug 34 which is suitably secured in a locket 36 in the end of an extendible boom, a portion of which is shown at 38. The enlarged portion 26 of said actuating shaft 18 additionally includes a generally annular recess 40 which has a tapered sidewall and which partially receives a coil spring 42 that surrounds a portion of the actuating shaft 18 in the bore 16. The upper end of the spring 42 engages the top wall 17 of said bore. Normally, with the boom 38 in its retracted position, as shown in FIG. 1, the mass 10 is received within a cup-like support 43 which may be secured, by a plurality of screws 44 in recesses 46 in the base of said support, to the surface of a satellite, a portion of which is shown at 48. The support 43 has a central bore 50 which, at its lower end, opens into a shallow, generally annular recess 52 in the base of said support. A spring collar 54 surrounds the enlarged portion 26 of the actuating shaft 18 and is received within the central bore 50. The collar 54 is provided with an annular flange 56 which is received in the shallow annular recess 52 and is secured in place by a plurality of countersunk cap screws 58. The collar 54 includes a plurality of circumferentially spaced spring fingers 60, all of which, as shown at 62, have outwardly bowed end portions, for a purpose to be described hereinafter.

As shown in FIG. 1, when the boom 22 is in its retracted position, the outwardly bowed end portions 62 of the spring fingers 60 engage in an annular groove 64 that is formed in the mass 10 near the lower end of the bore 16. The bowed end portions 62 are held in said groove 64 by the enlarged portion 26 of the actuating shaft 18. More particularly, the annular recessed land 30, provided adjacent the tapered wall 32, engages and biases outwardly the vowed end portions 62 of the spring fingers 60, forcing them to engage in the annular groove 64 and thereby lock the mass 10 on the support 43. The coil spring 20, which surrounds the upper end portion of the shaft 18, is compressed between the bottom wall 15 of the bore 14 and the washer 22 to positively seat the mass 10 on the cup-like suport 26.

As is well understood in the art, the boom 38 may be extended to some length by a drive means (not shown). Upon initial movement of the boom 38 toward its extended position (in the direction indicated by the arrows of FIG. 1) the enlarged portion 26 of the actuating shaft 18 will move to a position shown in phantom, thereby disengaging the annular land 30 from the outwardly bowed ends 62 of the spring fingers 60. As clearly shown in FIG. 2, the spring fingers 60 are purposely performed such that, upon their release by the annular land 30, they will move radially toward each other to the positions shown in phantom in FIG. 1, and thereby disengage from the annular groove 64 at the base of the mass 10. The mass 10 will thus be unlocked from the cup-like support 42 so that it can be extended at the end of the boom 38. Additionally, the resilient action of the compressed coil spring 20 will assist in moving the enlarged portion 26 to its position shown in phantom in FIG. 1. As a result, the enlarged portion 26 will readily disengage from the bowed ends 62 of the spring fingers 60 without the presence of shock or unbalanced forces which would tend to disrupt the orientation of the satellite 48 in free space. The spring 42 will be compressed only slightly upon the initial outward movement of the boom 48 and will cooperate with the coil spring 20 to eliminate any shock, unbalanced forces or oscillations of the mass 10.

When the boom 38 is returned to its retracted position, the coil spring 20 will compress, as described, and urge the mass 10 to seat positively on the support 43. The bowed end portions 62 of the spring fingers 60 will, as previously described, impinge on the tapered wall 32 of the actuating shaft 18 and will be camed radially outward thereby as the boom 38 is retracted until said bowed end portions 62 are engaged in the annular groove 44 in the base of the mass 10, when said mass will again be locked on the cup-like support 43.

What is claimed is:
1. A mass release mecahnism, comprising,
   a fixed support,
   a mass receivable on said support,
   means mounted on said suport for releasably engaging said mass,
   means slidably attached to said mass and cooperating with said first-mentioned means for releasably locking said mass on said support,
   said first-mentioned means being disengageable from said mass upon sliding movement of said second-mentioned means, and
   actuating means joined to said second-mentioned means and external of the mass for providing the necessary force to cause sliding movement of said second-mentioned means.

2. The structure of claim 1, wherein said first-mentioned means surrounds said second mentioned means, and
   said second-mentioned means includes means for camming said first-mentioned means outwardly to engage releasably said mass.
3. The structure of claim 1, and further including
   means on said second-mentioned means for damping oscillations of said mass.
4. The structure of claim 1, and further including
   resilient means for urging said mass to seat positively on said support.
5. The structure as recited in claim 4, and further including
   means cooperating with said resilient means for damping oscillations of said mass.
6. The device as recited in claim 1, and further including
   resilient means engaging said mass for effecting sliding movement of said second-mentioned means.
7. The device as recited in claim 6, and further including
   means on said second-mentioned means for camming said first mentioned means to engage releasably said mass.
8. In combination with a satellite and an extendible boom on the satellite,
   a support secured to the satellite,
   a mass seated on said suport while in the retracted position,
   means for attaching said mass to the extendible boom,
   means for resiliently mounting said mass on said first-mentioned means, and
   resilient means on said support and engaging said mass for releasably latching said mass on said support.
9. The combination as recited in claim 8, and further including
   slidable means on said first-mentioned means for biasing said resilient means to positively engage said mass.
10. The structure of claim 8, and further including
    means on said first-mentioned means for urging said mass to seat positively on said support.

References Cited
UNITED STATES PATENTS 3,072,105   1/1963   Johnson _____ 92—26
3,190,581   6/1965   Wilson _____ 244—1

FERGUS S. MIDDLETON, *Primary Examiner.*

U.S. Cl. X.R.

24—211; 92—26; 287—58